United States Patent
Nagura

(10) Patent No.: US 11,085,799 B2
(45) Date of Patent: Aug. 10, 2021

(54) POSITION DETECTION APPARATUS THAT DETECTS A POSITION OF AN OBJECT BY DETECTING LIGHT FROM A SCALE, AND LITHOGRAPHY APPARATUS, FORCE SENSOR, AND APPARATUS HAVING FORCE SENSOR INCLUDING THE POSITION DETECTION APPARATUS

(71) Applicant: CANON KABUSHIKI KAISHA, Tokyo (JP)

(72) Inventor: Chihiro Nagura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 16/565,590

(22) Filed: Sep. 10, 2019

(65) Prior Publication Data

US 2020/0088552 A1    Mar. 19, 2020

(30) Foreign Application Priority Data

Sep. 14, 2018   (JP) .............................. JP2018-172821

(51) Int. Cl.
*G01D 5/347* (2006.01)

(52) U.S. Cl.
CPC ..... *G01D 5/34746* (2013.01); *G01D 5/34715* (2013.01); *G01D 5/34776* (2013.01)

(58) Field of Classification Search
CPC .. G01D 5/38; G01D 5/34715; G01D 5/34746; G01D 5/34776

USPC ................. 250/231.13, 214 R, 221
See application file for complete search history.

(56) References Cited

U.S. PATENT DOCUMENTS

| | | | |
|---|---|---|---|
| 7,589,314 B2 * | 9/2009 | Oka | G01D 5/38 250/231.13 |
| 9,354,089 B2 | 5/2016 | Nagura | |
| 9,618,370 B2 | 4/2017 | Nagura | |

FOREIGN PATENT DOCUMENTS

| | | |
|---|---|---|
| JP | 2012220460 A | 11/2012 |
| JP | 2015200568 A | 11/2015 |

* cited by examiner

*Primary Examiner* — Que Tan Le
(74) *Attorney, Agent, or Firm* — Rossi, Kimms & McDowell LLP

(57) ABSTRACT

The present invention provides a position detection apparatus that is provided with a scale and a detector and includes a processing unit configured to perform processing for setting a number of light receiving elements that are consecutive in a direction of relative movement and whose outputs are to be added for the light receiving elements so that, in a first resolution mode, a phase of a component of a fourth spatial frequency lower than a spatial frequency corresponding to a frequency offset amount is detected and, in a second resolution mode for which a resolution is lower than the first resolution mode, a phase of a component of a spatial frequency of an interference image of a second grating pattern is detected.

14 Claims, 14 Drawing Sheets

POSITION DETECTION APPARATUS THAT DETECTS A POSITION OF AN OBJECT BY DETECTING LIGHT FROM A SCALE, AND LITHOGRAPHY APPARATUS, FORCE SENSOR, AND APPARATUS HAVING FORCE SENSOR INCLUDING THE POSITION DETECTION APPARATUS

BACKGROUND OF THE INVENTION

Field of the Invention

The present invention relates to a position detection apparatus, a lithography apparatus, a force sensor, and an apparatus having a force sensor.

Description of the Related Art

Japanese Patent Laid-Open No. 2012-220460 proposes an optical position detection apparatus capable of separating and detecting only a specific periodic component from a plurality of scale patterns having mutually different periods, by switching an arrangement connection of a light receiving element array. Such an optical position detection apparatus can dynamically switch between a signal having a low resolution and a wide absolute value specifying range, and a signal having a high resolution and a narrow absolute value specifying range.

However, in this optical position detection apparatus, when the ratio between the resolutions is large, the number of light receiving elements configuring the light receiving element array is greater, leading to a decrease in efficiency or an increase in junction capacitance in the separation band structure. There is a possibility that such a degradation of characteristics will cause the accuracy of position detection by the optical position detection apparatus to decrease.

SUMMARY OF THE INVENTION

The present invention provides a position detection apparatus which is advantageous for detecting the position of a target object with high accuracy at different resolutions.

According to one aspect of the present invention, there is provided a position detection apparatus that is provided with a scale and a detector, either of the scale and the detector being provided on a target object, and is operable to detect a position of the target object by detecting light from the scale by the detector, wherein the scale includes a first grating pattern having a first spatial frequency in a direction of relative movement between the scale and the detector, and a second grating pattern having a second spatial frequency lower than the first spatial frequency in the direction of relative movement, the detector includes a plurality of light receiving elements arranged along the direction of relative movement, and the position detection apparatus includes an optical grating disposed between the scale and the detector and having a third spatial frequency that is offset, by a predetermined frequency offset amount, from a spatial frequency of an interference image from the first grating pattern in the direction of relative movement, and a processing unit configured to perform processing for setting a number of light receiving elements that are consecutive in the direction of relative movement and whose outputs are to be added for the plurality of light receiving elements so that, in a first resolution mode, a phase of a component of a fourth spatial frequency lower than a spatial frequency corresponding to the frequency offset amount is detected from light that has passed the first grating pattern and the optical grating and, in a second resolution mode for which a resolution is lower than the first resolution mode, a phase of a component of a spatial frequency of an interference image of the second grating pattern is detected from light that has passed the second grating pattern and the optical grating.

Further features of the present invention will become apparent from the following description of exemplary embodiments with reference to the attached drawings.

DESCRIPTION OF THE EMBODIMENTS

Figure 1:
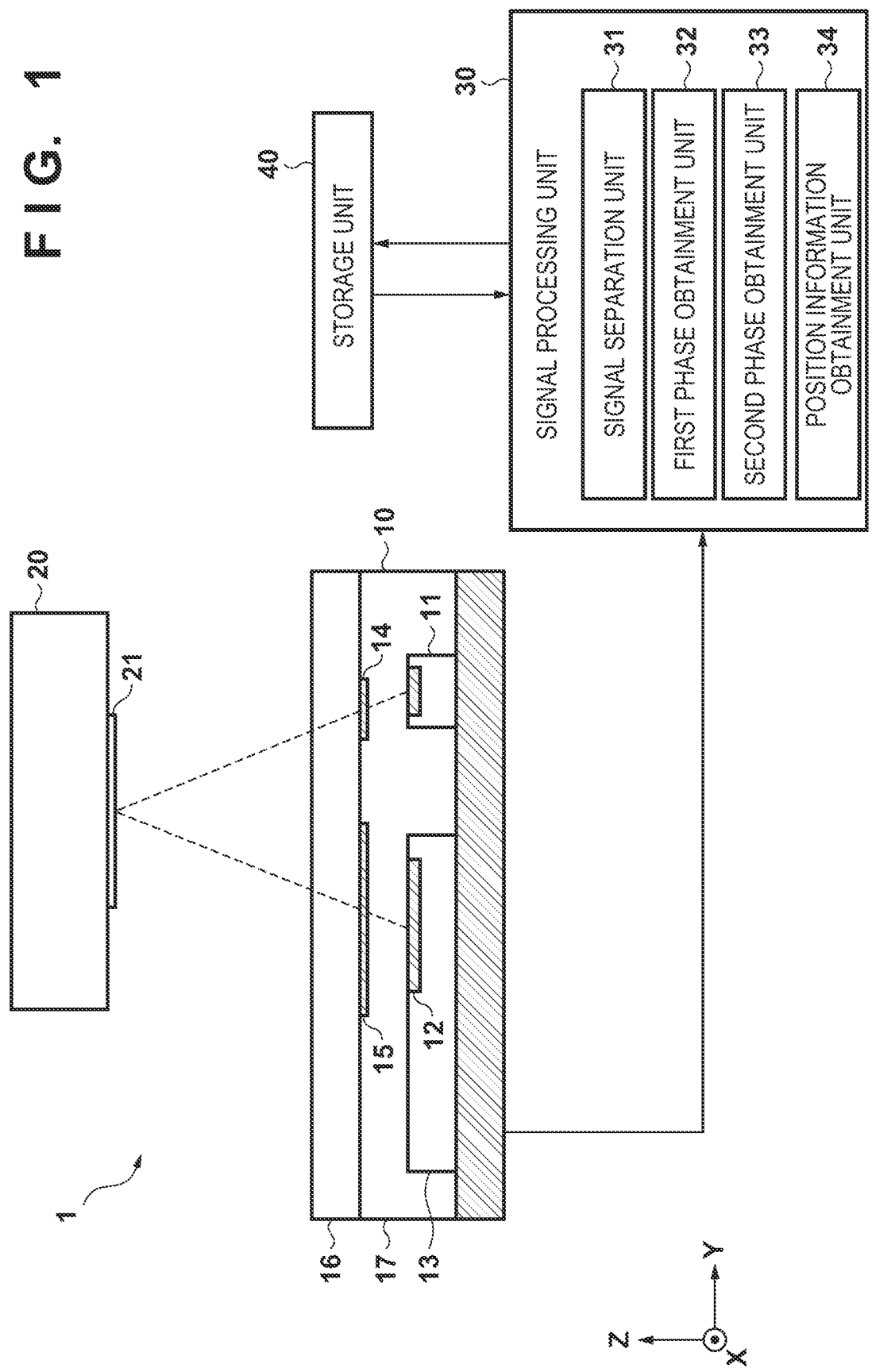
FIG. 1 is a schematic diagram illustrating a configuration of an encoder as one aspect of the present invention.

Preferred embodiments of the present invention will be described below with reference to the accompanying drawings. Note that the same reference numerals denote the same members throughout the drawings, and a repetitive description thereof will not be given.

First Embodiment

FIG. 1 is a schematic diagram illustrating a configuration of an encoder 1 as one aspect of the present invention. The encoder 1 is an optical position detection apparatus that is provided with a scale and a detector, either of which is provided on a target object, and detects the position of the target object by detecting light from the scale with the detector.

The encoder 1 is a linear encoder having a sensor unit 10 attached to a fixed portion of an apparatus (not shown) which is a target object of position detection, and a scale 20 that is attached to a movable portion of the apparatus can move with respect to the sensor unit 10 together with the movable portion. Note that the scale 20 may be attached to a fixed portion of the apparatus, and the sensor unit 10 may be attached to the movable portion of the apparatus. In other words, it is sufficient if the sensor unit 10 and the scale 20 can move relative to each other. Hereinafter, a direction of movement (an X direction) of the scale with respect to the sensor unit 10, that is, a direction of relative movement between the sensor unit 10 and the scale 20 is referred to as a position detection direction.

The sensor unit 10 is a light receiving/emitting integrated sensor unit in which a light emitting element 11 that includes a current-confined LED, and a light receiving IC 13 that includes a light receiving element array 12 are mounted in the same package. The light receiving element array 12 is a detector configured by arranging, in the position detection direction (the X direction), a plurality of light receiving elements for detecting an intensity distribution of light reflected by a scale grating (a scale pattern) 21 provided on the scale 20.

In the optical path from the light emitting element 11 toward the scale 20, a light source grating 14, as a first grating formed as a transmissive type diffraction grating that includes light transmissive portions and light shielding portions alternately arranged along the position detection direction, is provided.

In contrast, the scale 20 is provided with the scale grating 21 as a second grating formed as a reflection type diffraction grating that includes reflection portions and non-reflection portions alternately arranged along the position detection direction. Note that the scale grating 21 may be a phase grating in which steps are provided so that optical path lengths are periodically different. For example, by providing a step of ¼ of the wavelength of the light from the light emitting element 11 in the phase grating and providing a reflection film uniformly thereon, it is possible to increase the diffraction efficiency of ±first-order diffracted light contributing to an output signal from the light receiving element array 12.

An index grating 15 (optical grating) as a third grating is provided in the optical path from the scale 20 to the light receiving element array 12, that is, between the scale 20 and the light receiving element array 12. The index grating 15 is formed as a transmissive type diffraction grating that includes light transmissive portions and light shielding portions alternately arranged along the position detection direction. Each of the light source grating 14 and the index grating 15 is formed by providing a chromium film serving as a light transmissive portion on one surface of the cover glass 16. In order to reduce direct incidence on the light receiving element array 12 due to internal reflection, a film having a lower reflection such as chromium oxide may be used instead of the chromium film. The cover glass 16 onto which the light source grating 14 and the index grating 15 are formed is optically integrated with the light emitting element 11 and the light receiving IC 13 by being bonded to a translucent resin 17, in which light emitting element 11 and the light receiving IC 13 are encapsulated.

The signal processing unit 30 processes an output signal from the light receiving element array 12 of the sensor unit 10 and converts it into position information. The signal processing unit 30 also performs interpolation processing of the signal obtained by the sensor unit 10, writing and reading of the signal to and from the storage unit 40, and the like. The signal processing unit 30 includes a signal separation unit 31, a first phase obtainment unit 32, a second phase obtainment unit 33, and a phase information obtainment unit 34 in addition to a noise filter, an amplification circuit, and an A/D conversion circuit.

The signal separation unit 31 has a function of switching between the high resolution mode and the low resolution mode by separating the output signal from the light receiving element array 12 into signals corresponding to respective regions (regions A and B) of the scale grating 21. Here, the low resolution mode is a mode (a second resolution mode) having a resolution lower than that of the high resolution mode (a first resolution mode). When a switch circuit is provided on the light receiving IC 13, the signal separation unit 31 outputs a signal for switching connection by the switch circuit, thereby separating output signals from the light receiving element array 12. In this manner, the signal separation unit 31 separates the output signal from the light receiving element array 12 into a signal corresponding to a first pattern (regions A) and a signal corresponding to a second pattern (regions B).

Figure 2:
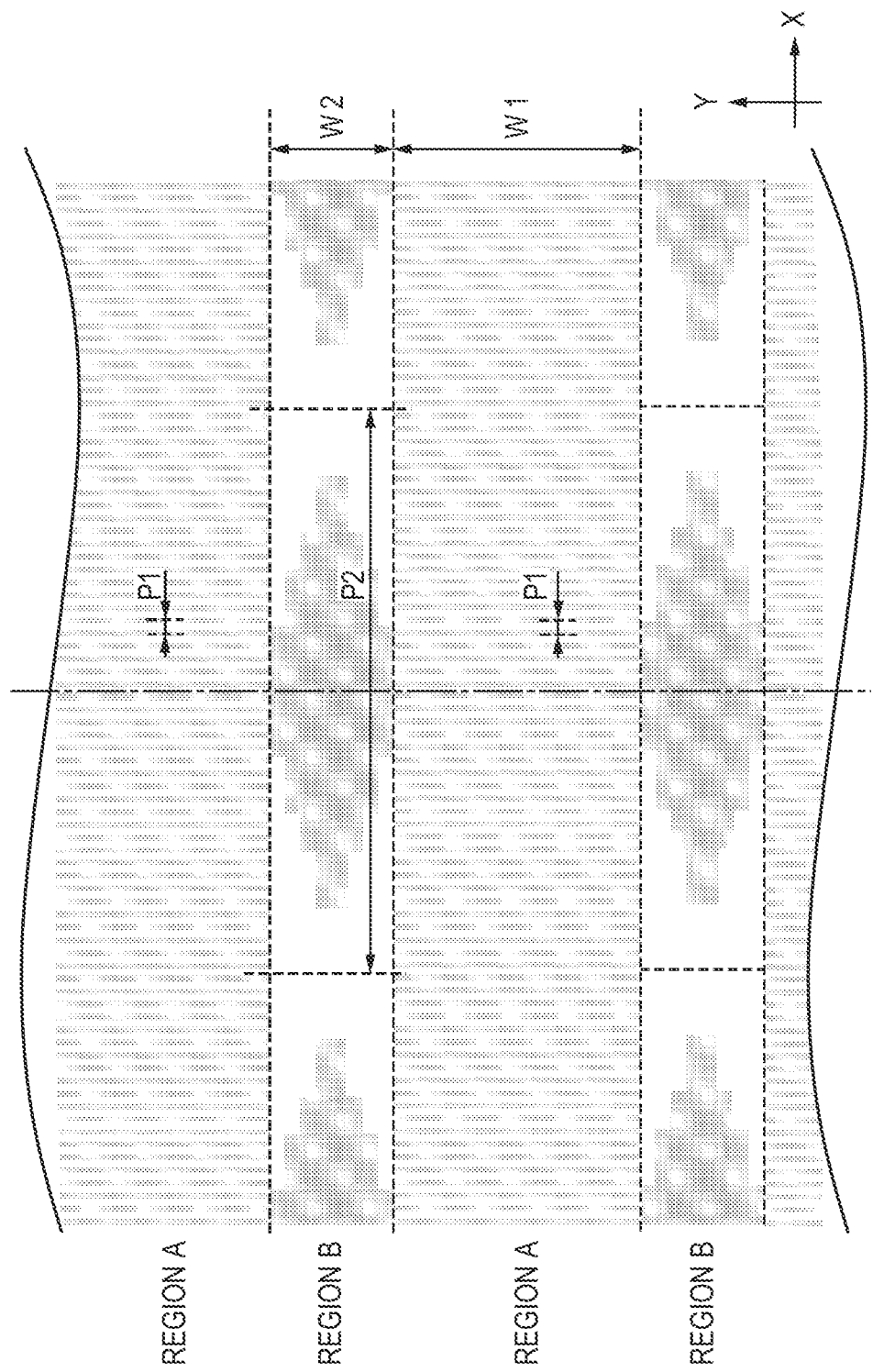
FIG. 2 is an enlarged plan view that illustrates a part of a scale.
Figure 3:
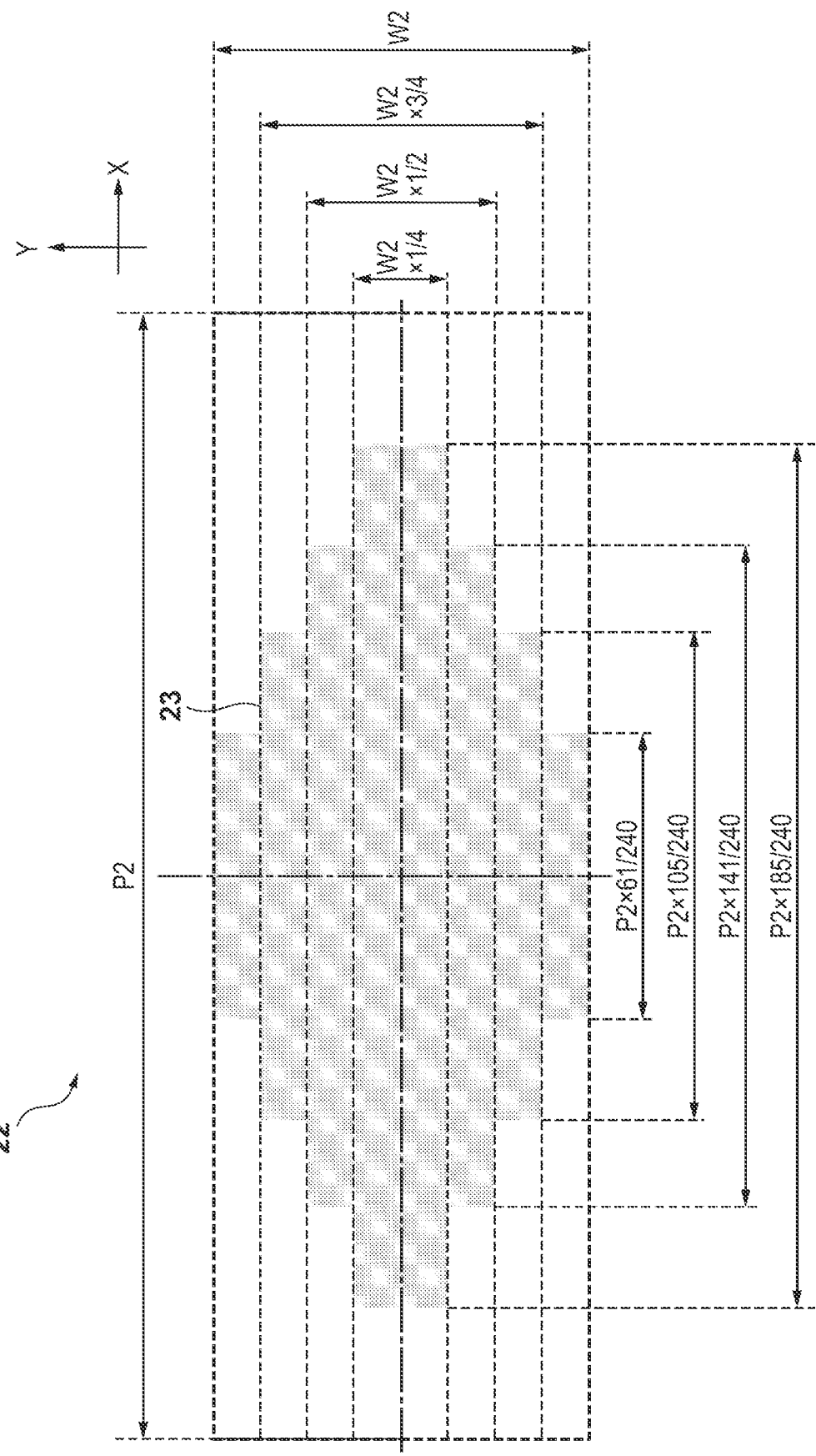
FIG. 3 is an enlarged plan view that illustrates a part of the scale.

The configuration of the scale grating 21 in the scale 20 will be described with reference to FIGS. 2 and 3. FIGS. 2 and 3 are enlarged plan views that illustrate a part of the scale 20 (the scale grating 21). The scale grating 21 is configured by alternately arranging two types of regions A and B in a direction (a Y direction) perpendicular to the position detection direction, that is, the movement direction (X direction).

A region A has a grating pattern sequence (a first grating pattern having a first spatial frequency in the direction of relative movement) in which reflective films having P1/2 widths are formed every pitch P1 (=8 μm) along the X direction. A region B has a pattern sequence (a second grating pattern having a second spatial frequency lower than the first spatial frequency in the direction of relative movement) in which the pattern 22 illustrated in FIG. 3 is arranged every pitch P2 (=512 μm) along the X direction. The pitch of the pattern of a region B is four or more times the pattern of the pitch of a region A, and preferably eight times or more. The width W1 of a region A in the Y direction is 50 μm, and the width W2 of a region B in the Y direction is 25 μm.

The pattern 22 of the region B illustrated in FIG. 3 will be described. In a region where the distance from the center in the Y direction is W2×⅛ or less, the width of the reflective film 23 in the X direction is P2×185/240. In a region where the distance from the center in the Y direction is W2×⅛ to W2×¼, the width of the reflective film 23 in the X direction is P2×141/240. In a region where the distance from the center in the Y direction is W2×¼ to W2×⅜, the width of the reflective film 23 in the X direction is P2×105/240. In a region where the distance from the center in the Y direction is W2×⅜ to W2×½, the width of the reflective film 23 in the X direction is P2×61/240. As described above, by varying the width of the reflective film 23 in the direction perpendicular to the movement direction of the scale grating 21, it is possible to cancel a high-frequency component in a wide range with respect to the distance between the sensor unit 10 and the scale 20.

Figure 4:
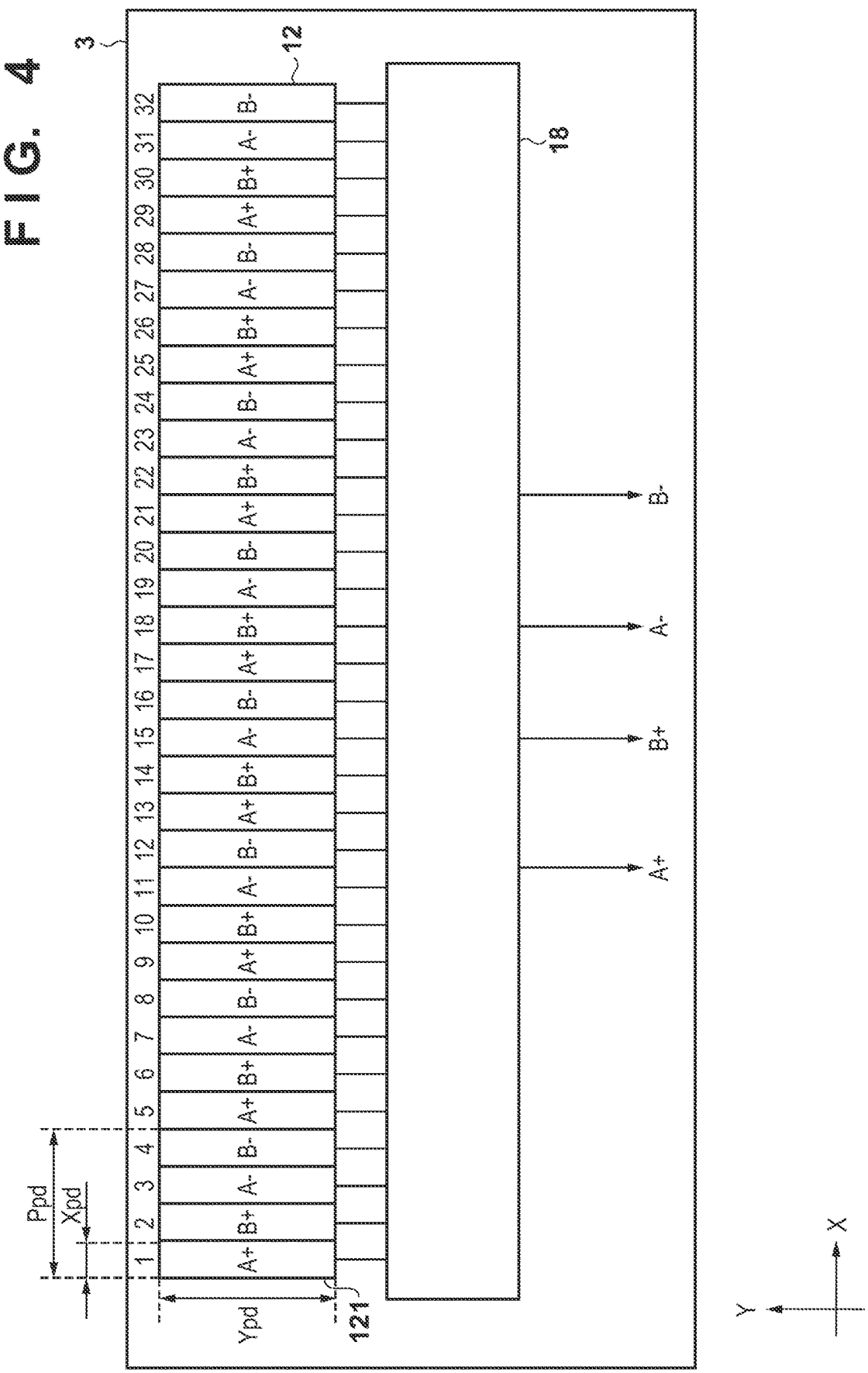
FIG. 4 is a view illustrating an arrangement of a plurality of light receiving elements that configure a light receiving element array.
Figure 5:
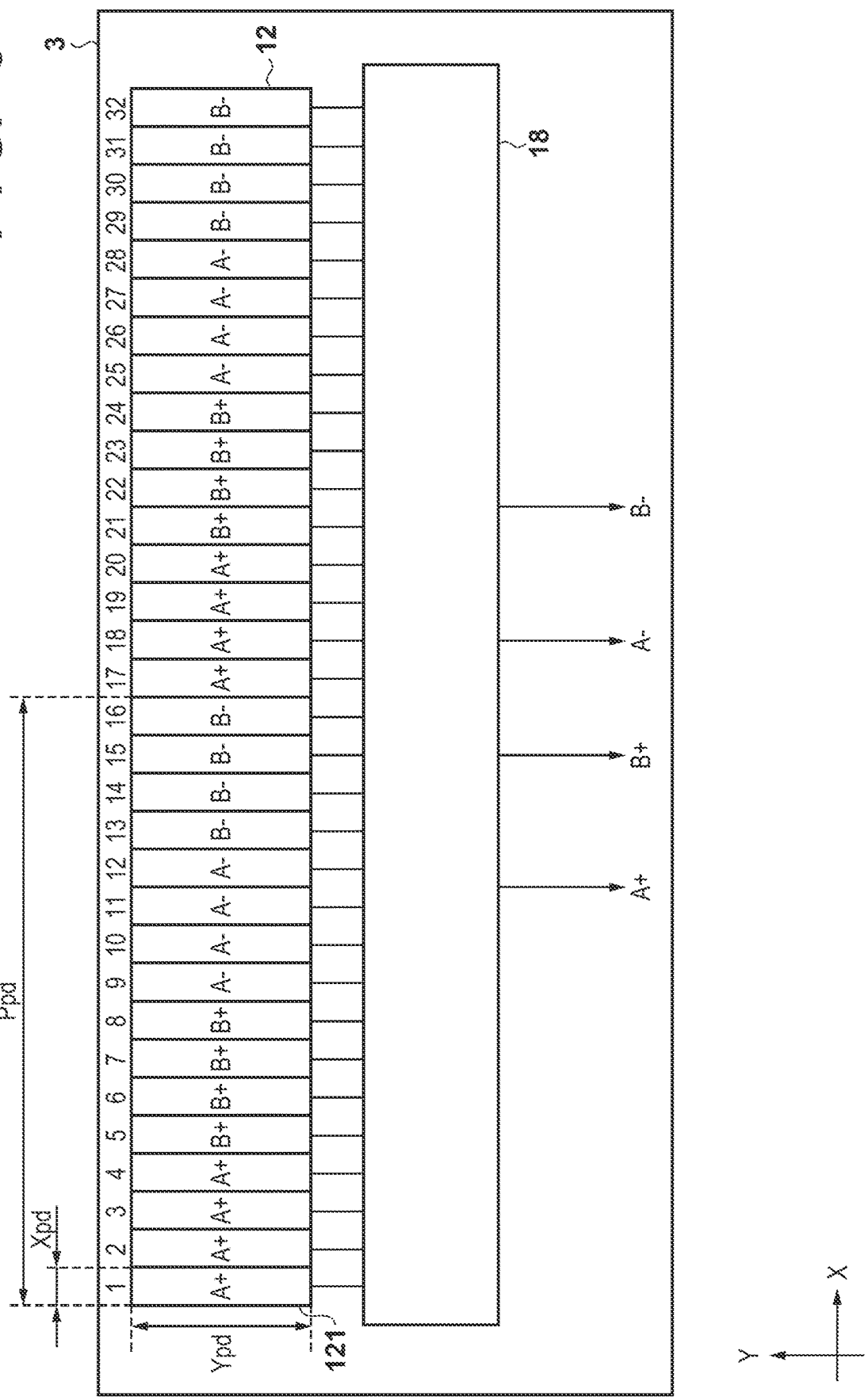
FIG. 5 is a view illustrating an arrangement of a plurality of light receiving elements that configure a light receiving element array.

FIGS. 4 and 5 are views illustrating an arrangement of a plurality of light receiving elements 121 configuring the light receiving element array 12 in the present embodiment. In the present embodiment, the light receiving element array 12 is configured by arranging 32 light receiving elements 121 in a line in the position detection direction. A center-to-center distance (adjacent element pitch) $X_{pd}$ of two light receiving elements 121 adjacent to each other in the position detection direction is 64 μm. A size (width) $Y_{pd}$ of each light receiving element 121 in a direction orthogonal to the position detection direction is 450 μm.

Outputs from each light receiving element 121 are switched through the switch circuit 18, and are selectively connected to four first-stage amplifiers (not shown) in a subsequent stage. To each of the four first-stage amplifiers, light receiving elements 121 corresponding to output terminals A+, B+, A−, and B− (representing an A+ phase, a B+ phase, an A− phase, and a B− phase, respectively) are connected. The four first-stage amplifiers output four-phase sinusoidal outputs S(A+), S(B+), S(A−), S(B−) whose values change sinusoidally in accordance with the movement of the scale 20.

The switch circuit 18 switches the connections between the light receiving elements 121 and the output terminal of the first-stage amplifiers in accordance with an input from the signal separation unit 31 of the signal processing unit 30. As a result, in the plurality of light receiving elements 121, an interval at which outputs are electrically added is switched. In other words, the switch circuit 18 functions as a processing unit that performs processing for setting the number of light receiving elements 121 that are consecutive in the direction of relative movement and whose outputs are to be added, from among the plurality of light receiving elements 121.

When the input from the signal processing unit 30 is at a high level, as illustrated in FIG. 4, a center-to-center distance $P_{pd}$ of light receiving elements 121 that are electrically connected is 256 μm. When the input from the signal processing unit 30 is at a low level, as illustrated in FIG. 5, a center-to-center distance $P_{pd}$ of light receiving elements 121 that are electrically connected is 1024 μm.

With respect to each detection pitch, the relative phases of the four-phase sinusoidal signals are in a relationship where S(B+) is about +90 degrees, S(A−) is about +180 degrees, and S(B−) is about +270 degrees, with respect to S(A+).

The signal processing unit 30 performs calculations indicated by the following Equation (1) and Equation (2) on the four-phase sinusoidal outputs S(A+), S(B+), S(A−), and S(B−) to thereby generate two-phase sinusoidal signals S(A) and S(B) from which a direct current portion has been removed.

$$S(A) = S(A+) - S(A-) \quad (1)$$

$$S(B) = S(B+) - S(B-) \quad (2)$$

Figure 6:
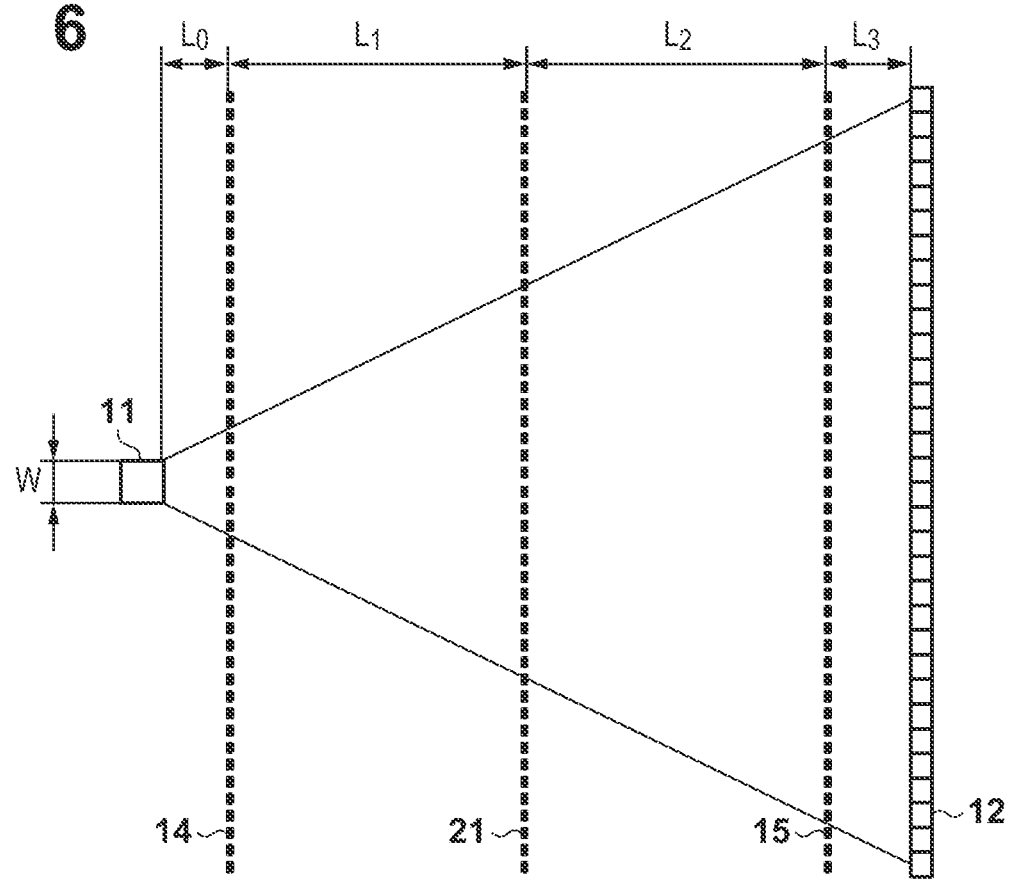
FIG. 6 is an exploded view of the optical path of the encoder.

FIG. 6 is an exploded view of the optical path of the encoder 1 in the present embodiment, that is, a view illustrating reflection as transmission. A distance $L_0$ from the light emitting element 11 to the light source grating 14 is set to 0.3 mm. A distance $L_2$ from the scale grating 21 to the index grating 15 is set to be equal to or within a range that can be treated as equal to a distance $L_1$ from the light source grating 14 to the scale grating 21, and in the present embodiment, it is set so that $L_1 = L_2 = 1$ mm. A distance $L_3$ from the index grating 15 to the light receiving element array 12 is set to 0.3 mm. Here, each of the distances $L_0$, $L_1$, $L_2$, and $L_3$ is shown as a value obtained by dividing a physical length by a refractive index, as an effective optical path length in geometrical optics. The width W of the light emitting region in the position detection direction of the light emitting element 11 is 32 μm, and the wavelength λ of light from the light emitting element 11 (an emission wavelength) is 650 nm.

Figure 7:
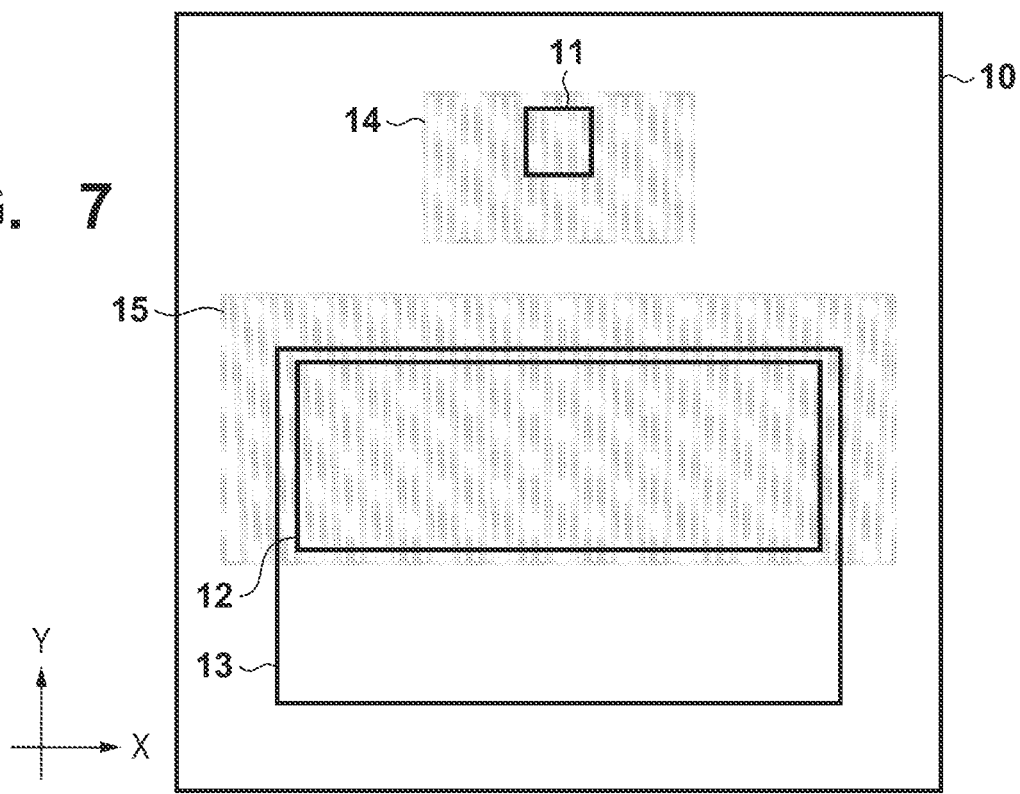
FIG. 7 is a view illustrating a sensor unit viewed from a scale side.

FIG. 7 is a view illustrating a sensor unit 10 viewed from a scale side. The grating pitch of the light source grating 14 is 8 μm. In the present embodiment, in the index grating 15, the grating pitch in the position detection direction continuously changes in a direction orthogonal to the position detection direction. When $L_0 = L_1 = 1$ mm, the position at which a principal ray (center light beam) of light incident on the light receiving element array 12 from the light emitting element 11 and the index grating 15 intersect is set to Y=0, and a direction near the light emitting element 11 is set to positive (Y>0). The grating pitch P3(Y) in the position detection direction of the index grating 15 follows a function represented by the following equation (3).

$$P3(Y) = 0.190725 \cdot Y + 8.29307 \, (\mu m) \quad (3)$$

Here, the reason why the period of the index grating 15 is changed in the direction orthogonal to the position detection direction is to stabilize the signal amplitudes and phase differences of the two-phase sinusoidal signals S(A) and S(B) due to change of L0 and L1, as disclosed in Japanese Patent Laid-Open No. 2015-200568. However, the present invention is not limited to this, and the period of the index grating 15 may be uniform in the direction orthogonal to the position detection direction.

The optical action of the high resolution mode will be described. In the high resolution mode, a signal (periodic signal) corresponding to the pattern (grating pattern sequence) of the region A of the scale grating 21 is obtained. In the high resolution mode, with the three-grating configuration, detection is performed by causing the first grating to function as the light source grating 14, the second grating as the scale grating 21, and the third grating as the index grating 15. In the high resolution mode, moire is generated by the scale grating 21 and the index grating 15.

Light (divergent light flux) emitted from the light emitting element 11 passes through the light source grating 14 to thereby form an array of a plurality of light sources disposed at mutually incoherent pitches. The light that exits from the light source grating 14 is incident on the scale grating 21. Note that, if the light emitting element 11 is a light source having a minute light emission point such as a semiconductor laser or a superluminescent diode (SLD), the light source grating 14 may be omitted.

The +first-order diffracted light and the −first-order diffracted light diffracted and reflected by the pattern of the region A of the scale grating 21 interfere with each other at the index grating 15. As a result, an interference fringe A having an intensity distribution with a period of 8 μm is formed on the index grating 15. A spatial frequency $f_{image}$ of the interference fringe A is represented by the following Equation (4) using the pattern frequency $f_A$ of the region A.

$$f_{image} = k \cdot f_A \cdot \frac{L_1 + L_2}{L_1} \quad (4)$$

In Equation (4), k is the order of the interference fringes (a natural number corresponding to the interference order), and when the interference fringes of both ±first-order diffracted lights are used, k=2. Note that, when the interference fringes of zero-order light and ±first-order diffracted light are used, k=1.

In contrast, because the grating frequency $f_{index}$ (=1/P3 (Y)) of the index grating 15 is slightly shifted from the spatial frequency $f_{image}$, an intensity distribution in which a coarser spatial frequency $f_m$ is superimposed, as an undulating-pattern, onto the original interference fringes passes through the index grating 15. In this manner, the index grating 15 has a spatial frequency (a third spatial frequency) that is offset, by a predetermined frequency offset amount, from the spatial frequency of the interference image from the pattern of the region A. Assuming that the grating frequency of the index grating 15 is $f_{index}$, the undulating spatial frequency $f_m$ with respect to the interference fringe is represented by the following Equation (5).

$$f_m(Y) = |f_{scale1} - f_{index}(Y)| \quad (5)$$

The intensity distribution of the spatial frequency $f_m$ that has passed through the index grating 15 further propagates and is projected onto the light receiving element array 12 at an image magnification $M_1$. The image magnification $M_1$ is represented by the following Equation (6). However, the effective distance $L_0$ depends on the effective size of the light source grating 14 or the like, and a value smaller than that of the actual distance $L_0$ may be applied.

$$M_1 = \frac{L_0 + L_1 + L_2 + L_3}{L_0 + L_1 + L_2} \quad (6)$$

The spatial frequency $f_{imageA}$ of the intensity distributions formed on the light receiving element arrays 12 according to the patterns of the regions A is represented by the following Equation (7).

$$f_{imageA}(M_1 \cdot Y) = \frac{f_m(Y)}{M_1} \quad (7)$$

In the present embodiment, k=2 and $M_1$=1.13. The spatial frequency $f_{imageA}$ has an intensity distribution expressed by the following Equation (8) in the light-receiving range of the light receiving element array 12.

$$\frac{1}{292.6}[\mu m^{-1}] < f_{imageA}(M_1 \cdot Y) < \frac{1}{227.6}[\mu m^{-1}] \quad (8)$$

Description is given regarding optical action in the low resolution mode. In the low resolution mode, a signal (periodic signal) corresponding to the pattern of the region B of the scale grating 21 is obtained. In the low resolution mode, with the three-grating configuration, detection is performed by causing the first grating to function as the light emitting element 11, the second grating as the scale grating 21, and the third grating as the light receiving element array 12. In the low resolution mode, the index grating 15 does not function and moire is not generated.

Light emitted from the light emitting element 11 (divergent light flux) is incident on the scale grating 21 via the light source grating 14. Zero-order diffracted light and ±first-order diffracted light diffracted and reflected by the pattern of the region B of the scale grating 21 pass through the index grating 15 and interfere with each other on the light receiving element array 12, and an interference fringe B is formed at an image magnification $M_2$. The image magnification $M_2$ is represented by the following Equation (9).

$$M_2 = \frac{L_0 + L_1 + L_2 + L_3}{L_0 + L_1} \quad (9)$$

When the scale 20 is a reflective scale, it is possible to, as in the present embodiment, form the light emitting element 11 and the light receiving element array 12 on substantially the same surface, so that M2=2 is substantially constant regardless of the distance between the sensor unit 10 and the scale 20.

Light emitted from the light emitting element 11 passes through the light source grating 14 in an outgoing path and the index grating 15 in a return path, but since a corresponding grating structure (close to the order of the grating period) does not exist in the region B of the scale grating, this light does not strongly participate in the interference fringe formed. However, as will be described later, it is necessary to consider a decrease of the contrast due to the diffraction of the index grating 15.

A spatial frequency $f_{imageB}$ of the interference fringe B is represented by the following Equation (10) using the pattern grating frequency $f_B$ (=1/P2) of the region B.

$$f_{imageB} = \frac{k \cdot f_B}{M_2} \quad (10)$$

In the present embodiment, k=1 and $M_2$=2. The spatial frequency $f_{imageB}$ has an intensity distribution indicated by the following Equation (11).

$$f_{imageB} = \frac{1}{1024}[\mu m^{-1}] \quad (11)$$

Figure 8:
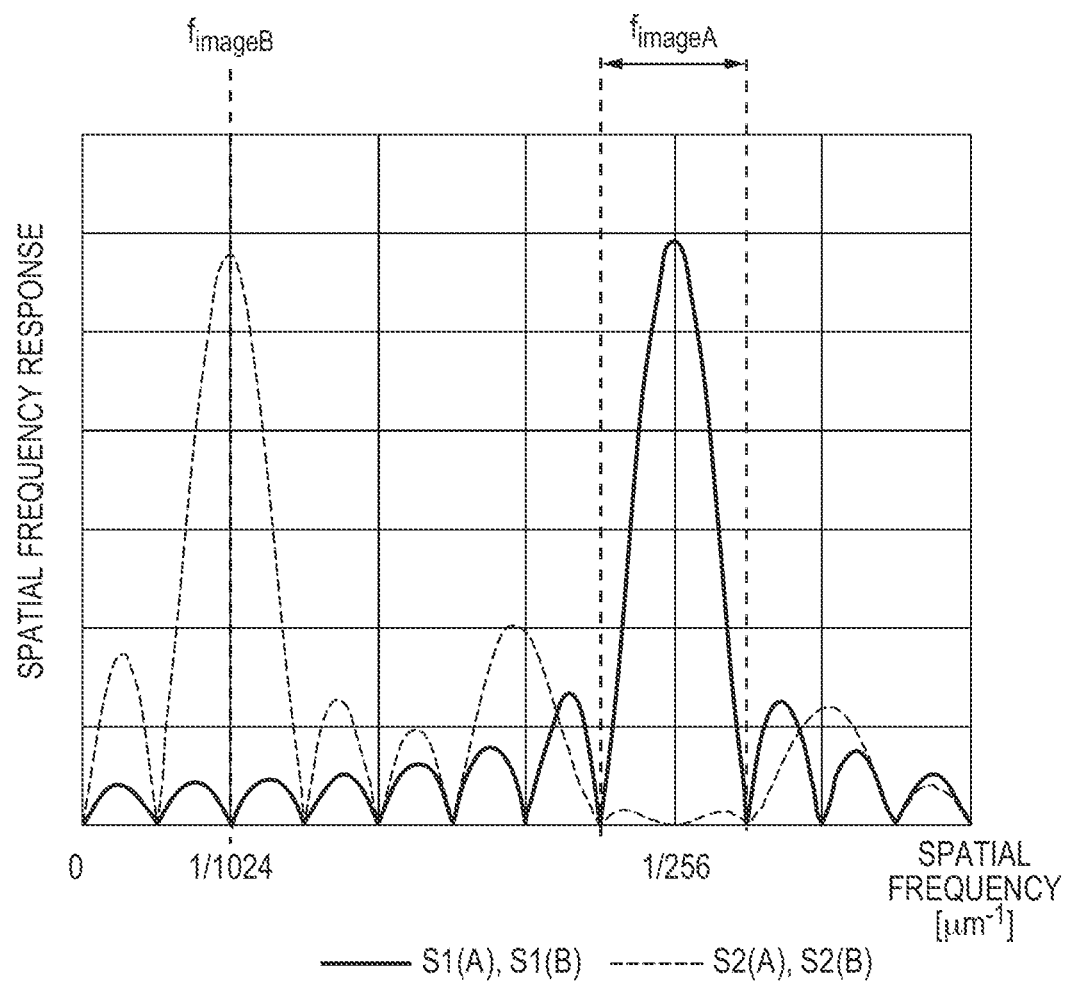
FIG. 8 is a view illustrating a spatial frequency response of the light receiving element array in a high resolution mode and a low resolution mode.

Next, description will be given for an effect of separating periodic signals from each other by setting the arrangement of the light receiving elements 121 in the respective resolution modes. FIG. 8 is a view illustrating a spatial frequency response of the light receiving element array 12 in a high resolution mode and a low resolution mode. The solid line is the spatial frequency response in the high resolution mode and the dashed line is the spatial frequency response in the low resolution mode.

In the high resolution mode, the switch circuit 18 is set to high, and the center-to-center distance $P_{pd}$ of the light receiving elements 121 of the light receiving element array 12 that are electrically connected is set to 256 μm. The peak of the spatial frequency response of the light receiving element array 12 (the light receiving element 121) is around 1/256 [μm$^{-1}$]. Since the range of the spatial frequency $f_{imageA}$ of the intensity distributions formed in the light receiving element arrays 12 is near the peak of the spatial frequency response, the components of the pattern in the region A of the scale grating 21 can be efficiently detected. In contrast, it can be seen that the spatial frequency response becomes relatively low near the spatial frequency $f_{imageB}$ (=1/1024 [μm$^{-1}$]) of the interference image from the pattern of the region B of the scale grating 21, and signal variation that is a disturbance is suppressed. In the high resolution mode, the number (a first number) of the light receiving elements 121 whose outputs are to be added is set so that the peak of the spatial frequency response of the light receiving element array 12 approaches a spatial frequency (fourth spatial frequency) lower than the spatial frequency corresponding to the frequency offset amount of the index grating 15.

In the low resolution mode, the switch circuit 18 is set to low, and the center-to-center distance Ppd of the light receiving elements 121 of the light receiving element array 12 that are electrically connected is set to 1024 μm. The peak of the spatial frequency response of the light receiving element array 12 (the light receiving element 121) is around $1/1024$ [μm$^{-1}$]. Since the spatial frequency $f_{imageB}$ (=$1/1024$ [μm$^{-1}$]) of the intensity distribution formed in the light receiving element array 12 and the peak of the spatial frequency response substantially coincide with each other, the components of the pattern in the region B of the scale grating 21 can be efficiently detected. In contrast, it can be seen that the spatial frequency response is relatively low with respect to the range of the spatial frequency $f_{imageA}$ corresponding to the intensity distribution from the pattern of the region A of the scale grating 21, and signal variation that is disturbance is suppressed. In the low resolution mode, the number of light receiving elements 121 whose outputs are to be added (a second number different from the first number) is set so that the peak of the spatial frequency response of the light receiving element array 12 approaches the spatial frequency of the interference image from the pattern of the region B.

The relationship between the peak frequency fpeak1 of the spatial frequency response of the light receiving element array 12 in the high resolution mode and the peak frequency $f_{peak2}$ of the spatial frequency response of the light receiving element array 12 in the low resolution mode is $f_{peak1} > f_{peak2}$. More preferably, $1.2 < f_{peak1} \div f_{peak2} < 4.0$ (even more preferably 3.0). A peak frequency $f_{peak}$ of the spatial frequency response of the light receiving element array 12 in the low resolution mode is represented by the following equation, where the pitch of the pattern of the region B of the scale grating 21 is $P_2$, and the natural number corresponding to the interference order is k.

$$f_{peak} = \frac{k}{2 \cdot P_2}$$

Figure 9:
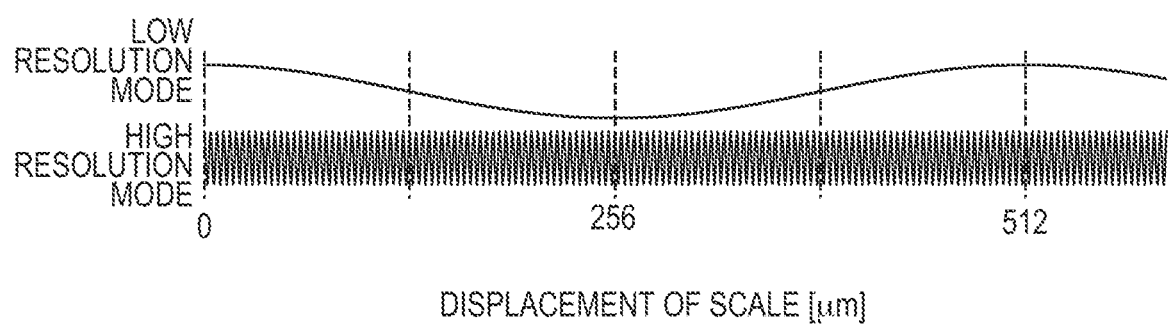
FIG. 9 is a view illustrating signal waveforms respectively obtained in the high resolution mode and the low resolution mode.

FIG. 9 is a view illustrating signal waveforms respectively obtained in the high resolution mode and the low resolution mode. In the high resolution mode, the signal period SpA is P1/k=4 μm. In the low resolution mode, the signal period SpB is P2/k=512 μm.

A ratio for the switched signal periods in the high resolution mode and the low resolution mode is 128 times (1:128), since the signal periods are 4 μm and 512 μm. In contrast, the ratio of the number of consecutive light receiving elements that are added together, which can be switched in each mode, is 4 times (4:1 since there are respectively 4 consecutive elements and 1 consecutive element), and this is kept very small with respect to the ratio between the signal periods. As a result, it is possible to prevent an increase in junction capacitance and a decrease in light receiving efficiency due to an increase in the separation band between respective light receiving elements.

As described above, in the encoder 1 according to the present embodiment, the function of each optical element in the three grating configuration is different when switching between the high resolution mode and the low resolution mode. This makes it possible to realize high responsiveness and detection efficiency while having a high resolution switching ratio.

Note that, in the encoder 1, it is preferable that, from among the period of the interference fringes from the region B of the scale grating 21 in the index grating 15 (on the optical grating) and the period of the index grating 15, the longer period be less than three times, and preferably less than 1.5 times, the shorter period.

Next, processing for obtaining absolute position information of a high resolution will be described. The first phase obtainment unit 32 obtains a phase (phase signal) Φ1 of an energy distribution in the region A of the scale grating 21 based on the two-phase sinusoidal signals S(A) and S(B) when the input to the switch circuit 18 is at the high level by the calculation of Equation (12) indicated below. Note that A TAN 2[Y, X] is an arctangent calculation function for determining quadrants and converting the quadrants into phases of 0 to 2π.

$$\Phi1 = ATAN2[S(A), S(B)] \quad (12)$$

Similarly, the second phase obtainment unit 33 obtains a phase (phase signal) Φ2 of an energy distribution in the region B of the scale grating 21 based on the two-phase sinusoidal signals S(A) and S(B) when the input to the switch circuit 18 is at the low level by the calculation of Equation (13) indicated below.

$$\Phi2 = ATAN2[S(A), S(B)] \quad (13)$$

The position information obtainment unit 34 of the present embodiment obtains the output of the first phase obtainment unit 32 as a relative position signal. By counting changes in the relative position signal, it is possible to obtain information on how many predetermined periods the scale 20 is positioned away from the detection start position.

It is possible to acquire the phases Φ1 and Φ2 at substantially the same position by obtaining signals without any time difference before/after the switching of the input to the switch circuit 18.

In the present embodiment, as illustrated in FIGS. 4 and 5, at least a subset of the plurality of light receiving elements 121 of the light receiving element array 12 are commonly used as a light receiving element 121 for obtaining the phase Φ1 and a light receiving element 121 for obtaining the phase Φ2. This makes it possible to downsize the light receiving element array 12 as compared with the case where a light receiving element for obtaining the phase Φ1 and a light receiving element for obtaining the phase Φ2 are separately provided as in the prior art.

The signal processing unit 30 obtains at which multiple of the period of the phase Φ1 the relative position is at within the period of the phase Φ2 by the calculation indicated in the following Equation (14), and obtains an absolute position signal ABS having the positional accuracy of the phase Φ1 by using the position detection with the phase Φ1 in conjunction with the position detection with the phase Φ2. By performing such processing, the absolute position of a long stroke can be detected with the high accuracy of the increment pattern signal.

$$ABS = 2\pi \cdot ROUND[((SpB/SpA \cdot \Phi2 - \Phi1)/(2\pi)] + \Phi1) \cdot SpA \text{ [μm]} \quad (14)$$

Figure 10:
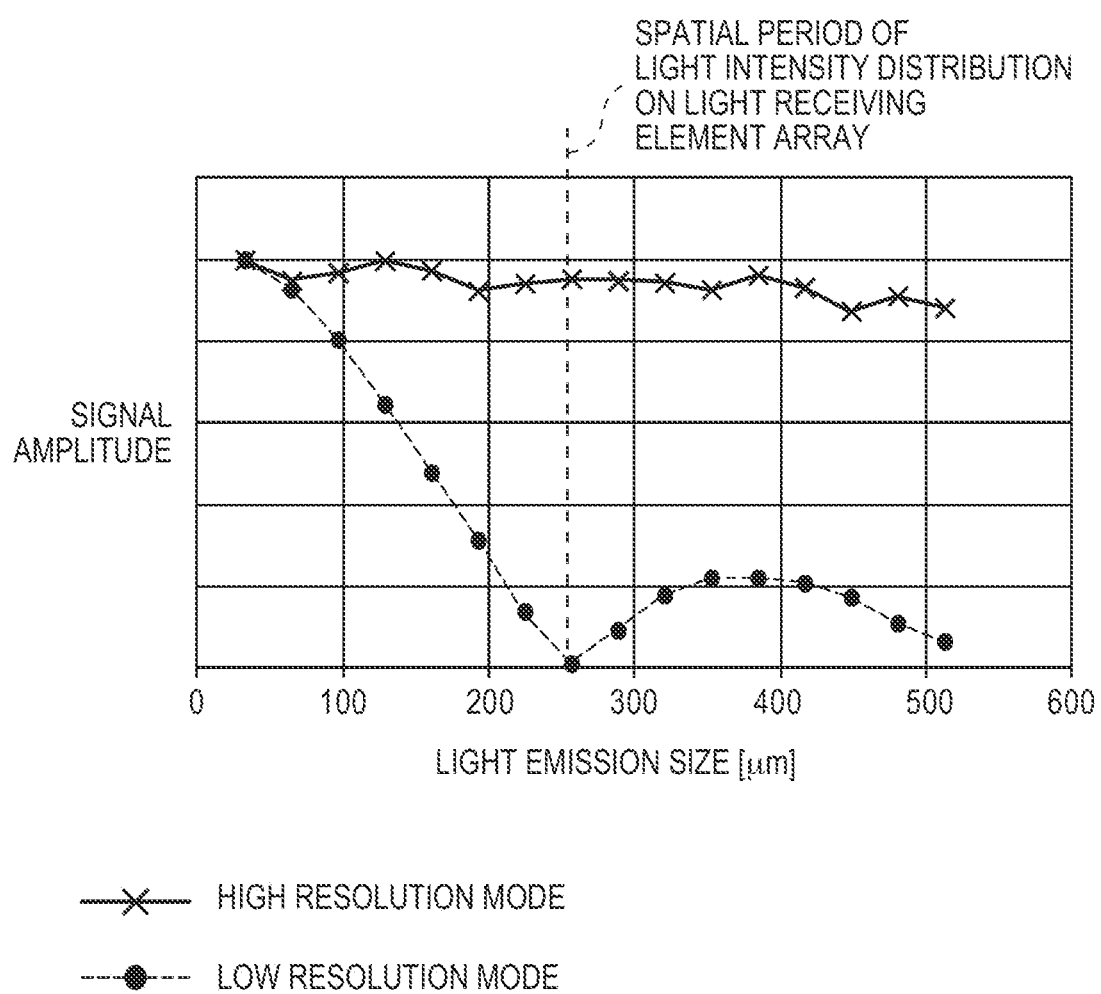
FIG. 10 is a view illustrating the attenuation of a signal amplitude with respect to the size of the light emitting element.

The influence of the size of the light emitting element 11 (a light source) will be described. FIG. 10 is a view illustrating attenuation of the signal amplitude with respect to the size (light emission size) W of the light emitting element 11 when the spatial period of the intensity distribution formed by the light receiving element array 12 is 256 µm.

The light amount distribution, on the light receiving element array, of the interference image in accordance with the pattern of the region A of the scale grating 21 in the high resolution mode can be approximated by a distribution obtained by performing a convolution with a point light source image after applying the optical lateral magnification $M_{LED1}$ shown in the following Equation (15) to the light emission size W. In the high resolution mode, even if the spatial period on the light receiving element array and the light emission size W approach each other, the contrast on the light receiving element array hardly changes.

$$M_{LED_1} = \frac{L_3}{L_0 + L_1 + L_2} \quad (15)$$

Meanwhile, it is also possible to approximate the light amount distribution, on the light receiving element array, of the interference image in accordance with the pattern of the region B of the scale grating 21 in the low resolution mode. Specifically, the distribution can be approximated by applying an optical lateral magnification $M_{LED2}$ represented by the following Equation (16) to the light emission size W and then performing a convolution with the interference image formed by minute point light sources.

$$M_{LED_2} = \frac{L_2 + L_3}{L_0 + L_1} \quad (16)$$

In the present embodiment, since the optical lateral magnification $M_{LED2}$ is 1, in the low resolution mode, when the spatial period on the light receiving element array and the light emission size W approach each other, the contrast on the light receiving element array disappears.

Referring to Equation (15) and Equation (16), since it is clear that $M_{LED2} > M_{LED1}$, when the spatial periods of the intensity distributions on the light receiving element array are set to be the same, the high resolution mode is less attenuated by the effect of the light emission size W as compared with the low resolution mode. In other words, as in the present embodiment, it is preferable from the viewpoint of signal efficiency that the arrangement period of the light receiving elements corresponding to the intensity distribution on the light receiving element array that is a detection target be reduced in the high resolution mode as compared with the low resolution mode.

Next, description will be given regarding the influence of diffraction by the index grating 15. In order to obtain satisfactory contrast of the intensity distribution on the light receiving element array, it is necessary to avoid the disappearance of fringes due to the diffraction by the index grating 15. When a light beam shift amount accompanying the propagation from the index grating 15 to the light receiving element array 12 reaches half of the period of the intensity distribution on the light receiving element array, the contrast becomes very small.

The period of the intensity distribution on the light receiving element array is $1/f_{imageA}$ in the high resolution mode and $1/f_{imageB}$ in the low resolution mode. In contrast, a diffraction angle θ of the index grating 15 on the spatial frequency $f_{index}$ is sin θ = $f_{index}$·λ, where λ is the wavelength of the light from the light emitting element 11. The light beam shift amount accompanying the propagation from the index grating 15 to the light receiving element array 12 is represented by $L_3$·tan θ. Here, when approximating sin θ ≈ tan θ ≈ θ, a condition under which good contrast is obtained is the following Equation (17) in the high resolution mode, and the following Equation (18) in the low resolution mode. Note that Δf is a frequency offset amount of the index grating 15.

$$f_{index} < \frac{1}{2 \cdot \lambda \cdot L_3 \cdot f_{imageA}} = \frac{M_1}{2 \cdot \lambda \cdot L_3 \cdot |\Delta f|} \quad (17)$$

$$M_1 = \frac{L_a + L_2 + L_3}{L_a + L_2}$$

$$f_{index} < \frac{1}{2 \cdot \lambda \cdot L_3 \cdot f_{imageB}} = \frac{M_2}{2 \cdot \lambda \cdot k \cdot f_B} \quad (18)$$

$$M_2 = \frac{L_a + L_2 + L_3}{L_a}$$

Second Embodiment

In the present embodiment, in the scale 20, a stepped portion that has been processed out of a quartz substrate is patterned as the scale grating 21 (regions A and B). The stepped portion is formed by etching to a depth of about ¼ of the wavelength of the light from the light emitting element 11, and an aluminum film as a reflection film and a dielectric film are laminated on the surface.

Figure 11:
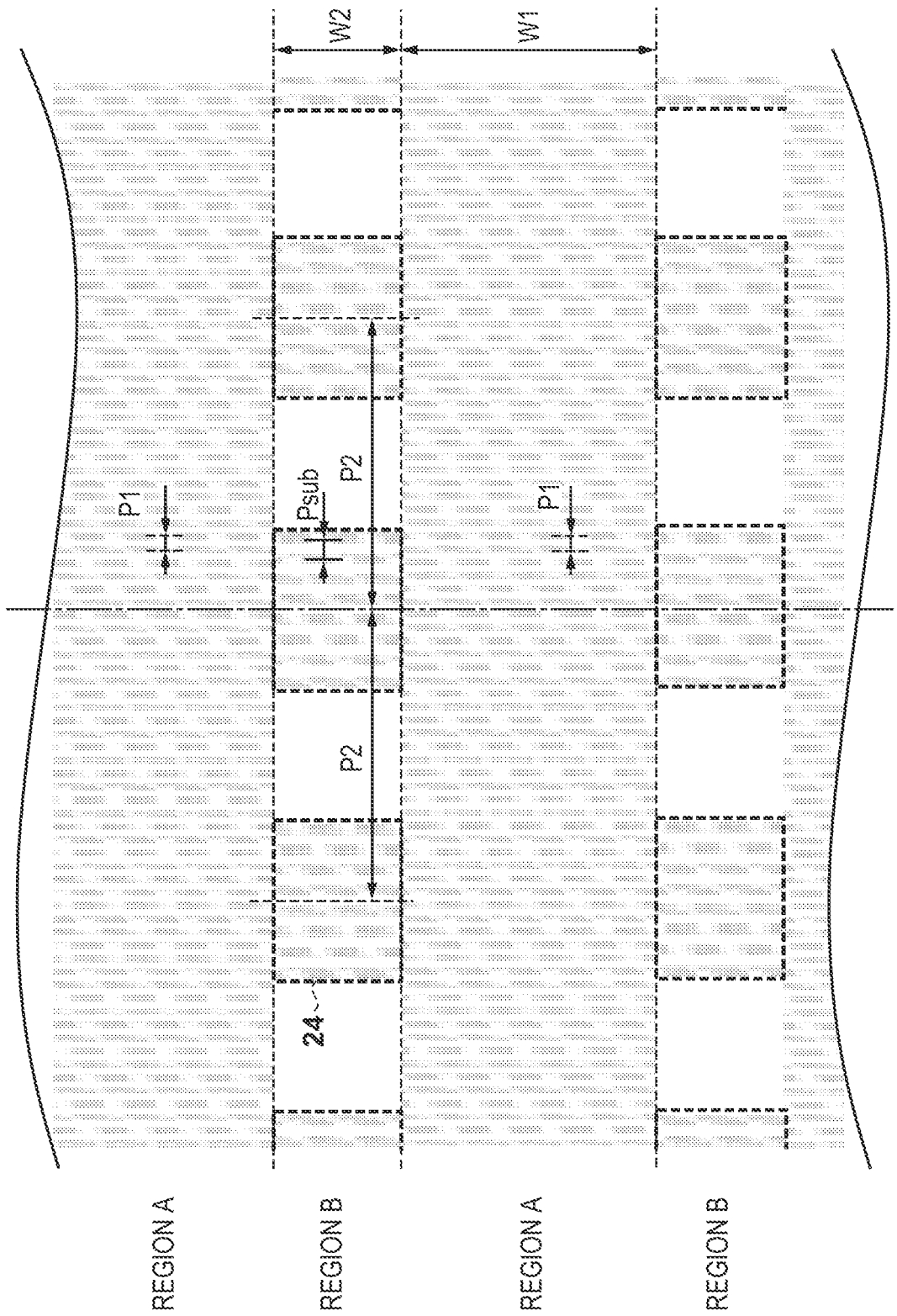
FIG. 11 is an enlarged plan view that illustrates a part of a scale.

The configuration of the scale grating 21 in the scale 20 will be described with reference to FIG. 11. FIG. 11 is an enlarged plan view that illustrates a part of the scale grating 21, where gray portions are concave portions of the stepped portion. The scale grating 21 is configured by alternately arranging two types of regions A and B in a direction perpendicular to the direction of relative movement.

The region A has a grating pattern sequence in which concave portions whose widths are P1/2 are formed every pitch P1 (=8 µm) along the X direction. The region B has a sub grating region 24 in which concave portions whose widths are P2/2 are formed every pitch P2 (=512 µm) along the X direction. Further, each of the sub grating regions 24 has a structure that includes a fine sub-grating in which concave portions whose widths are $P_{sub}/2$ are formed every pitch $P_{sub}$ along the X direction. In the present embodiment, the pitch $P_{sub}$ (sub grating period) is 1.65 µm. The width W1 of a region A in the Y direction is 50 µm, and the width W2 of a region B in the Y direction is 25 µm.

If the grating period of the scale grating 21 is approximately 10 µm or less, a stable contrast having a small gap dependence can be obtained by an averaging effect in accordance with the wavelength width of the light from the light emitting element 11 and an averaging effect in accordance with the difference in optical path length in the light receiving element array 12. However, when the grating period of the scale grating 21 is 10 µm or more, the range of the propagation length in which a good contrast can be obtained is limited by the interference of high-order diffracted light. The propagation length L is represented by the following Equation (19) in the low resolution mode and the following Equation (20) in the high resolution mode.

$$L = \frac{2 \cdot (L_0 + L_1) \cdot (L_2 + L_3)}{L_0 + L_1 + L_2 + L_3} \quad (19)$$

$$L = \frac{2 \cdot L_1 \cdot L_2}{L_1 + L_2} \quad (20)$$

When the grating structures are the same, the contrast changes periodically according to the relationship between the wavelength λ and the signal period Sp, and the propagation length L which is normalized by $Sp^2/\lambda$. Therefore, in some cases, it is impossible to simultaneously obtain good contrast in a plurality of regions whose signal periods Sp are very different at a common propagation length. In particular, in phase grating structures, contrast of an interference image with a large grating period cannot be achieved in the region of $L<0.5 \cdot Sp^2/\lambda$, that is, at a short propagation length.

Therefore, in the present embodiment, the above-mentioned problem is improved by having a structure in which each sub grating region 24 has a minute sub structure. The pitch $P_{sub}$ of the sub grating regions 24 may be made to be in the vicinity of what is found by the following Equation (21), where $L_c$ is the propagation length of a design center.

$$P_{sub} = \frac{\lambda \cdot L_c}{P_2} \quad (21)$$

Equation (21) is also represented by the following equations as the spatial frequency (fifth spatial frequency) $f_{sub}$ of the sub grating region 24. Note that the distance between the light emitting element 11 and the scale grating 21 is $L_a$ (=$L_0+L_1$), and the distance between the scale grating 21 and the light receiving element array 12 is $L_b=L_2+L_3$).

$$f_{sub} = \frac{P_2}{\lambda \cdot L}$$

$$L = \frac{2 \cdot L_a \cdot L_b}{L_a + L_b}$$

Figure 12:
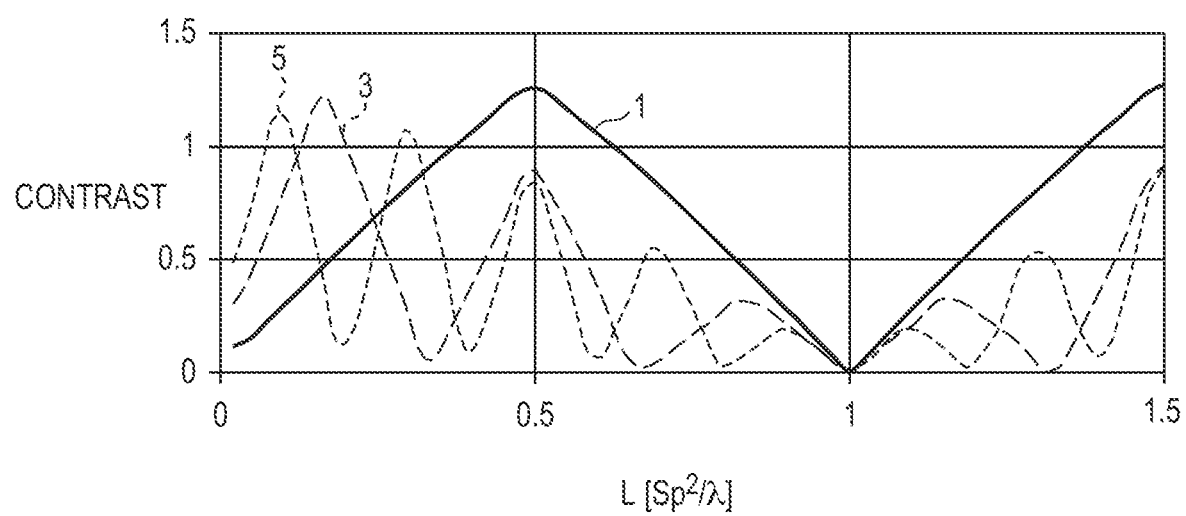
FIG. 12 is a graph illustrating a contrast of an interference image with respect to a propagation length.

When there is one sub grating in the sub grating region 24, the width of the sub grating is set as $P_{sub}/2$. FIG. 12 is a graph illustrating the contrast (P2 period modulation amplitude/DC component) of the interference image with respect to the propagation length L in the cases where the sub grating region 24 has one, three, or five sub gratings. Referring to FIG. 12, it can be seen that as the number of sub gratings increases, the contrast peak shifts toward a proximity side. This makes it possible to improve the contrast of a useful interference image under the condition of $L<0.5 \cdot Sp^2/\lambda$.

As described above, with the encoder 1 according to the present embodiment, it is possible to improve detection efficiency in a case where a switching ratio between the high resolution mode and the low resolution mode is large.

Third Embodiment

Figure 13:
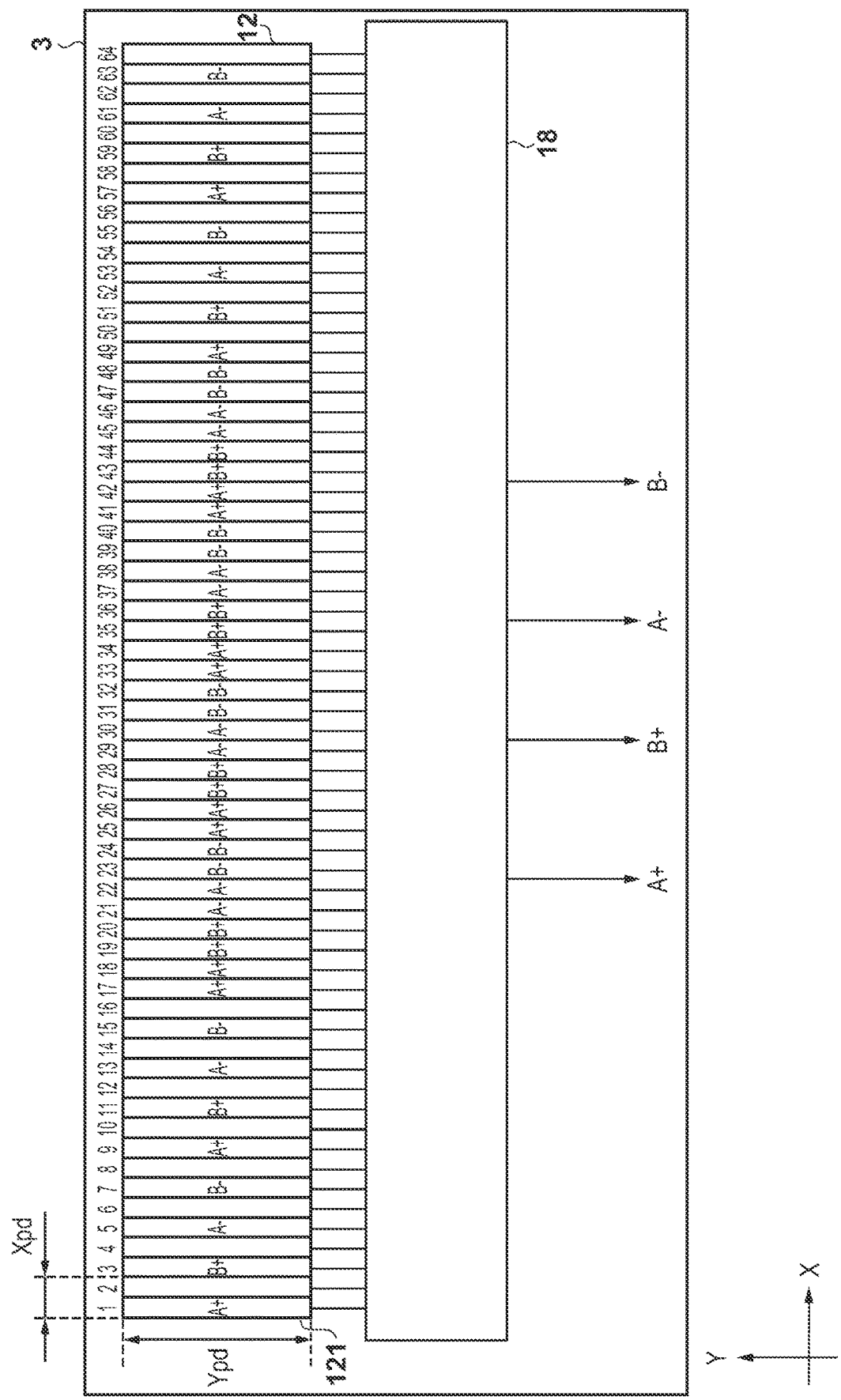
FIG. 13 is a view illustrating an arrangement of a plurality of light receiving elements that configure a light receiving element array.
Figure 14:
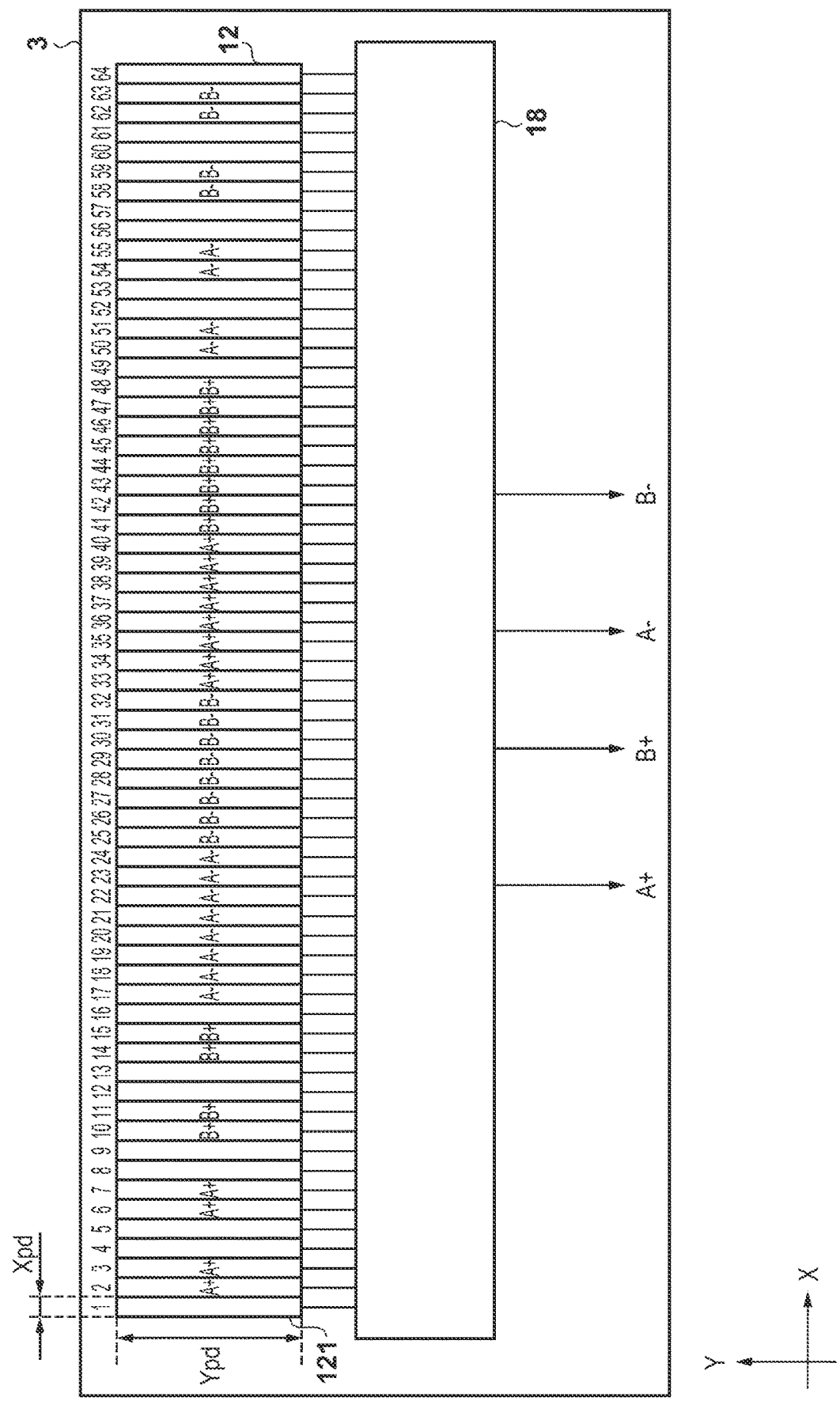
FIG. 14 is a view illustrating an arrangement of a plurality of light receiving elements that configure a light receiving element array.

FIGS. 13 and 14 are views illustrating an arrangement of a plurality of light receiving elements 121 configuring the light receiving element array 12 in the present embodiment. In the present embodiment, the light receiving element array 12 is configured by arranging 64 light receiving elements 121 in a line in the position detection direction. A center-to-center distance $X_{pd}$ of two light receiving elements 121 adjacent to each other in the position detection direction is 32 μm. A size (width) $Y_{pd}$ of each light receiving element 121 in a direction orthogonal to the position detection direction is 450 μm.

The switch circuit 18 switches the connections between the light receiving elements 121 and the output terminal of the first-stage amplifiers in accordance with an input from the signal separation unit 31 of the signal processing unit 30. As a result, in the plurality of light receiving elements 121, an interval at which electrical addition is to be performed is switched.

When the input from the signal processing unit 30 is at the high level, as illustrated in FIG. 13, for each of 16 light receiving elements 121 at the right and left of the 64 light receiving elements 121, a signal is extracted from one out of every two consecutive light receiving elements 121. Therefore, the weighting of the output signals from the 16 light receiving elements 121 on both sides, with respect to the output signals from the 32 light receiving elements 121 in the center, is ½.

When the input from the signal processing unit 30 is at the low level, as illustrated in FIG. 14, for the 16 light receiving elements 121 respectively at the right and left of the 64 light receiving elements 121, a signal is extracted from four out of every eight consecutive light receiving elements 121, where the middle two are not used. As described above, in the present embodiment, the sensor unit 10 is weighted. As a result, it is possible to improve respective signal separation accuracy.

Figure 15:
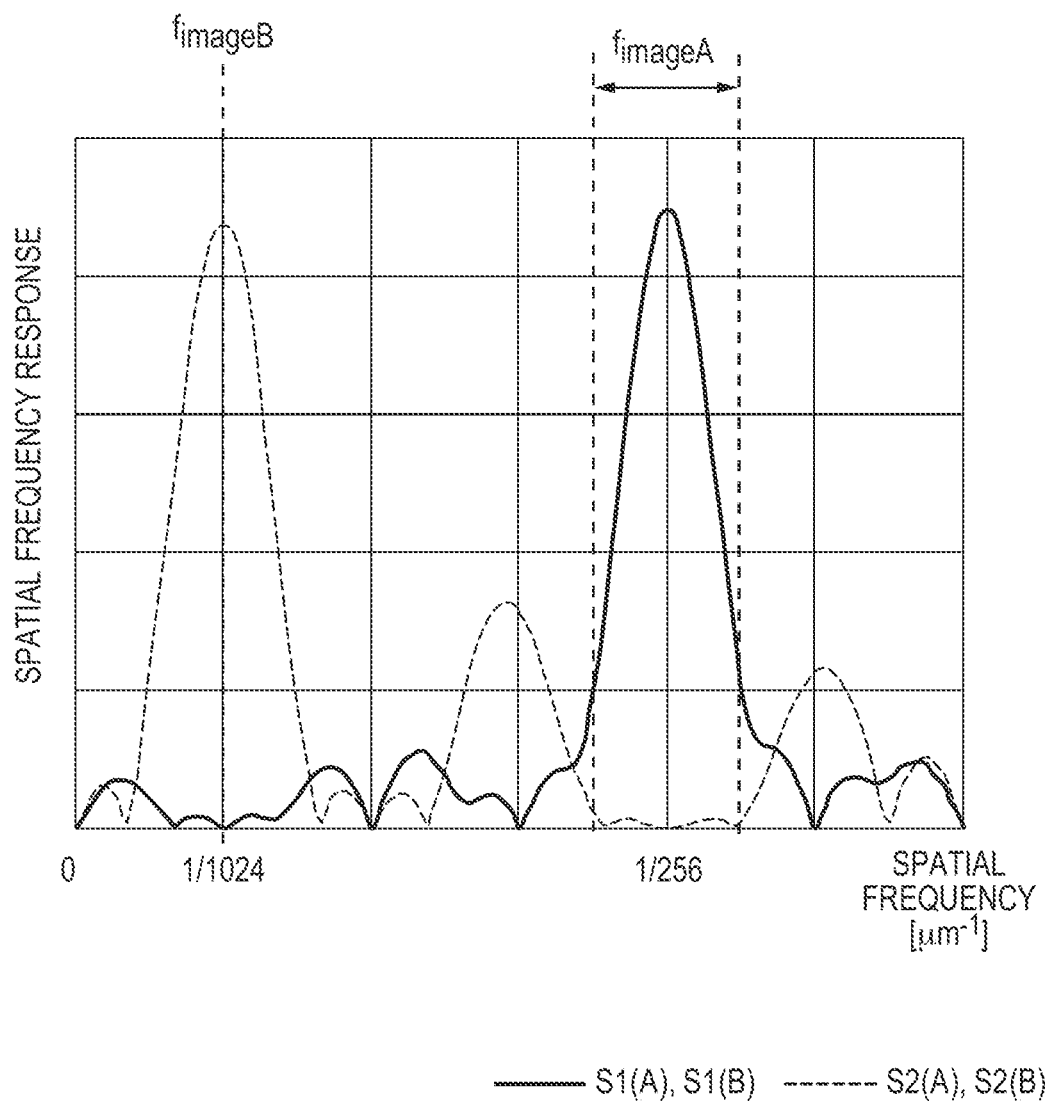
FIG. 15 is a view illustrating a spatial frequency response of the light receiving element array in a high resolution mode and a low resolution mode.

FIG. 15 is a view illustrating a spatial frequency response of the light receiving element array 12 in a high resolution mode and a low resolution mode. The solid line is the spatial frequency response in the high resolution mode and the dashed line is the spatial frequency response in the low resolution mode. Compared to FIG. 8, in the vicinity of the spatial frequency $f_{imageB}$, the spatial frequency response in the high resolution mode is reduced, and in the range of the spatial frequency $f_{imageA}$, the spatial frequency response in the low resolution mode is reduced.

As described above, with the sensor unit 10 according to the present embodiment, it is possible to improve signal separation accuracy for switching between the high resolution mode and the low resolution mode.

Fourth Embodiment

Figure 16:
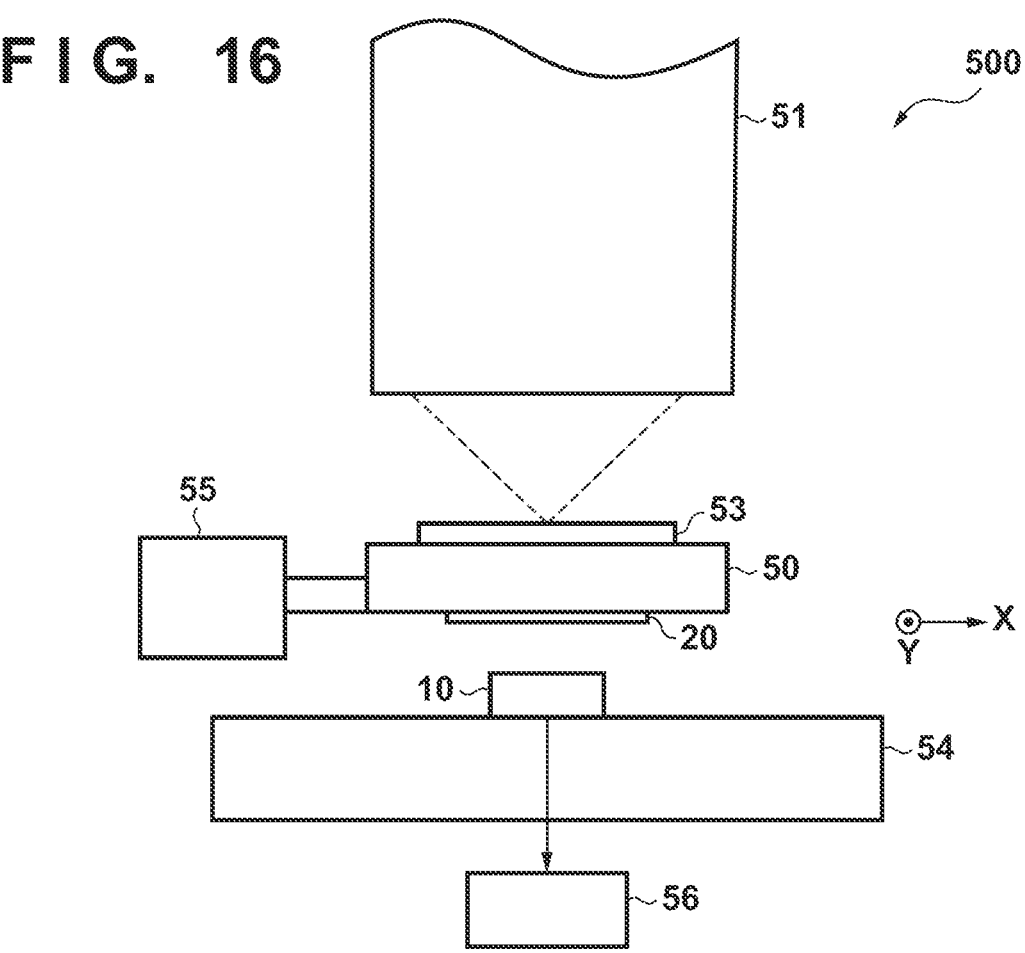
FIG. 16 is a schematic diagram illustrating a configuration of an exposure apparatus as one aspect of the present invention.

FIG. 16 is a schematic diagram illustrating a configuration of an exposure apparatus 500 as an example of an apparatus having the encoder 1 described in the first embodiment. The exposure apparatus 500 is used in a lithography process which is a process of manufacturing a semiconductor device or a liquid crystal display element, and is a lithography apparatus for forming a pattern (an electronic circuit pattern) on a substrate (a semiconductor wafer). In the exposure apparatus 500, the encoder 1 is used to detect a position of a stage that moves in a two-dimensional direction while holding a substrate.

The stage 50 is a movable portion that can operate, and holds a substrate 53. The projection optical system 51 is an optical system that projects (exposes) an optical image (pattern image) of a pattern of a mask (not shown) onto the substrate 53. A driving unit 55 drives the stage 50 in the X direction and the Y direction with respect to the projection optical system 51. As a result, the projection position of the pattern image of the mask on the substrate is controlled.

In the present embodiment, the scale 20 of the encoder 1 is attached to the stage 50, and the sensor unit 10 of the encoder 1 is attached to a housing 54 which is a fixed portion of the exposure apparatus 500. As the encoder 1, that described in the second embodiment or the third embodiment may be used.

A control unit 56 obtains the position of the stage 50 from the output from the light receiving element array 12 of the sensor unit 10, and controls the driving unit 55 based on the obtained position of the stage 50. In other words, the control unit 56 controls the position of the stage 50 based on the detection result of the encoder 1.

As described above, in the present embodiment, by stably, and at high resolution, detecting the position of the stage 50 of the exposure apparatus 500 using the encoder 1 described in the first embodiment, movement (operation) of the stage 50 can be controlled with high accuracy. Note that the encoder 1 described in the first embodiment, the second embodiment, and the third embodiment is not limited to an exposure apparatus, and can be used for detecting the position of a movable portion in various apparatuses such as a robot arm and a conveyance apparatus.

The method of manufacturing an article in an embodiment of the present invention is suitable for manufacturing an article such as a device (for example, a semiconductor element, a magnetic storage medium, a liquid crystal display element, or the like). The manufacturing method includes a step of exposing (forming a pattern on) a substrate to which a photosensitive agent has been applied using the exposure apparatus 500, and a step of developing (processing) the exposed substrate. The manufacturing method may also include other well-known processes (such as oxidation, deposition, evaporation, doping, planarization, etching, resist stripping, dicing, bonding, packaging, and the like). The method of manufacturing an article in the present embodiment is advantageous in at least one of performance, quality, productivity, and production cost of the article as compared with the prior art.

Fifth Embodiment

Figure 17:
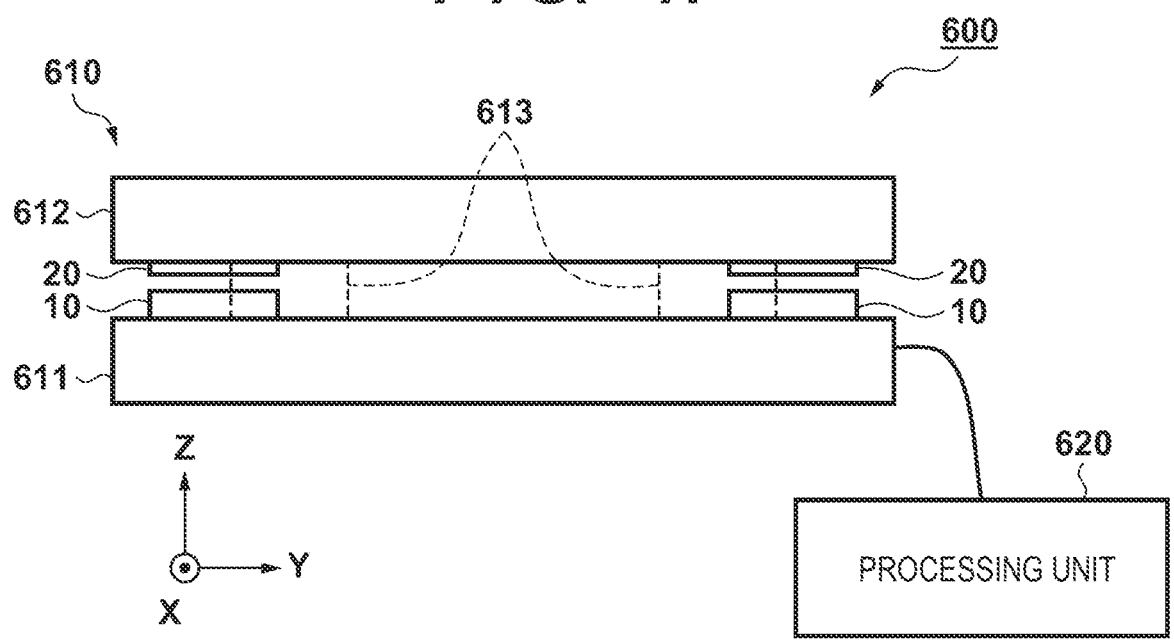
FIG. 17 is a schematic diagram illustrating a configuration of a force sensor as one aspect of the present invention.

In the present embodiment, an example in which the encoder 1 described in the first embodiment is applied to a force sensor for detecting an external force will be described. FIG. 17 is a schematic diagram illustrating a configuration of an optical force sensor 600 according to the present embodiment. The force sensor 600 includes a force sensor unit 610 and a processing unit 620. The force sensor unit 610 outputs, to the processing unit 620, a displacement signal indicating a displacement generated by the displacement unit 612 in the force sensor unit in accordance with an external force. The processing unit 620 obtains a vector amount of the external force based on the displacement signal input from the force sensor unit 610, and outputs a result of the obtaining as a force signal.

The force sensor unit 610 includes a base unit 611, a displacement unit 612, an elastic support portion (an elastic member) 613 that connects and supports the base unit 611 and the displacement unit 612, and a displacement detection unit 614. The displacement detection unit 614 includes the encoder 1 configured by the sensor unit 10 and the scale 20, and detects the displacement of the displacement unit 612 (the position of the displacement unit 612) with respect to the base unit 611. The displacement detection direction is the X direction in FIG. 17. The displacement unit 612 can be rotationally displaced about the Z axis with respect to the base unit 611 while elastically deforming the elastic support portion 613 in accordance with an external force acting on the displacement unit 612. The external force is substantially proportional to the relative displacement amount between the sensor unit 10 and the scale 20. Accordingly, by multiplying a position detection value of the encoder 1 by a coefficient, it can be converted into an external force (that is, the external force acting on the displacement unit 612 can be detected).

Various apparatuses having the force sensor 600 of the present embodiment also configure one aspect of the present invention. Such an apparatus includes, for example, a movable portion, a force sensor 600, and a control unit that controls the operation of the movable portion using the force sensor 600.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2018-172821 filed on Sep. 14, 2018, which is hereby incorporated by reference herein in its entirety.

What is claimed is:

1. A position detection apparatus that is provided with a scale and a detector, either of the scale and the detector being provided on a target object, and is operable to detect a position of the target object by detecting light from the scale by the detector, wherein
the scale includes a first grating pattern having a first spatial frequency in a direction of relative movement between the scale and the detector, and a second grating pattern having a second spatial frequency lower than the first spatial frequency in the direction of relative movement,
the detector includes a plurality of light receiving elements arranged along the direction of relative movement, and
the position detection apparatus comprises:
an optical grating disposed between the scale and the detector and having a third spatial frequency that is offset, by a predetermined frequency offset amount, from a spatial frequency of an interference image from the first grating pattern in the direction of relative movement; and
a processing unit configured to perform processing for setting a number of light receiving elements that are consecutive in the direction of relative movement and whose outputs are to be added for the plurality of light receiving elements so that, in a first resolution mode, a phase of a component of a fourth spatial frequency lower than a spatial frequency corresponding to the frequency offset amount is detected from light that has passed the first grating pattern and the optical grating and, in a second resolution mode for which a resolution is lower than the first resolution mode, a phase of a component of a spatial frequency of an interference image of the second grating pattern is detected from light that has passed the second grating pattern and the optical grating.

2. The position detection apparatus according to claim 1, wherein the processing unit performs processing for, in the first resolution mode, setting the number of light receiving elements to a first number so as to bring a peak of a spatial frequency response of the detector closer to the fourth spatial frequency, and, in the second resolution mode, setting the number of light receiving elements to a second number different from the first number so as to bring a peak of the spatial frequency response of the detector closer to the spatial frequency of the interference image from the second grating pattern.

3. The position detection apparatus according to claim 1, wherein the longer period, from out of a period of the interference image from the second grating pattern on the optical grating and a period of the optical grating, is less than three times the shorter period.

4. The position detection apparatus according to claim 1, wherein a pitch of the second grating pattern is four times or more a pitch of the first grating pattern.

5. The position detection apparatus according to claim 1, wherein a relation between a peak frequency $f_{peak1}$ of a spatial frequency response of the detector in the first resolution mode and a peak frequency $f_{peak2}$ of a spatial frequency response of the detector in the second resolution mode satisfies $f_{peak1} > f_{peak2}$.

6. The position detection apparatus according to claim 1, wherein the plurality of light receiving elements are arranged to receive light from the first grating pattern and light from the second grating pattern.

7. The position detection apparatus according to claim 1, wherein a peak frequency $f_{peak}$ of a spatial frequency response of the detector in the second resolution mode satisfies $$f_{peak} = \frac{k}{2 \cdot P_2}$$

where $P_2$ is a pitch of the second grating pattern and k is a natural number corresponding to an interference order.

8. The position detection apparatus according to claim 1, wherein the second grating pattern includes a phase grating in which regions having different optical path lengths are periodically formed in the direction of relative movement, and the phase grating includes a sub grating having a fifth spatial frequency higher than the second spatial frequency.

9. The position detection apparatus according to claim 8, wherein the fifth spatial frequency satisfies $$f_{sub} = \frac{P_2}{\lambda \cdot L}$$

$$L = \frac{2 \cdot L_a \cdot L_b}{L_a + L_b}$$

wherein $f_{sub}$ is the fifth spatial frequency, $P_2$ is a pitch of the second grating pattern, $\lambda$ is a wavelength of light incident on the scale, $L_a$ is a distance between the scale and a light source of the light incident on the scale, and $L_b$ is a distance between the scale and the detector.

10. The position detection apparatus according to claim 1, wherein the third spatial frequency satisfies $$f_{index} < \frac{M_1}{2 \cdot \lambda \cdot L_3 \cdot |\Delta f|}$$

$$M_1 = \frac{L_a + L_2 + L_3}{L_a + L_2}$$

wherein $f_{index}$ is the third spatial frequency, $\Delta f$ is the frequency offset amount, $\lambda$ is a wavelength of light incident on the optical grating, $L_a$ is a distance between the scale and a light source of the light incident on the scale, $L_2$ is a distance between the scale and the optical grating, and $L_3$ is a distance between the optical grating and the detector.

11. The position detection apparatus according to claim 1, wherein the third spatial frequency satisfies $$f_{index} < \frac{M_2}{2 \cdot \lambda \cdot k \cdot f_B}$$

$$M_2 = \frac{L_a + L_2 + L_3}{L_a}$$

wherein $f_{index}$ is the third spatial frequency, $f_B$ is the second spatial frequency, k is a natural number corresponding to an interference order, $L_a$ is a distance between the scale and a light source of light incident on the scale, $L_2$ is a distance between the scale and the optical grating, and $L_3$ is the distance between the optical grating and the detector.

12. A lithography apparatus operable to form a pattern on a substrate, comprising:
a stage configured to hold and move the substrate;
the position detection apparatus according to claim 1 configured to detect a position of the stage as a position of a target object; and
a control unit configured to control the position of the stage based on a detection result by the position detection apparatus.

13. A force sensor comprising:
an elastic support portion configured to connect and support a base unit and a displacement unit;
a detection unit configured to detect a displacement of the displacement unit with respect to the base unit to detect an external force that acts on the displacement unit; and
wherein the detection unit includes the position detection apparatus according to claim 1 which detects a position of the displacement unit as a position of the target object.

14. An apparatus comprising:
a movable portion;
the force sensor according to claim 13; and
a control unit configured to control the operation of the movable portion using the force sensor.

* * * * *